United States Patent [19]
Naito et al.

[11] Patent Number: 4,821,107
[45] Date of Patent: Apr. 11, 1989

[54] MULTI-FUNCTIONAL IMAGING APPARATUS

[75] Inventors: Yoshikazu Naito; Keiji Nakatani; Kanji Wada, all of Osaka, Japan

[73] Assignee: Minolta Camera Kabushiki Kaisha, Osaka, Japan

[21] Appl. No.: 148,635

[22] Filed: Jan. 26, 1988

[30] Foreign Application Priority Data

Jan. 26, 1987 [JP] Japan .................................. 62-15571
Dec. 1, 1987 [JP] Japan ................................. 62-305400

[51] Int. Cl.⁴ .............................................. H04N 1/32
[52] U.S. Cl. ...................................... 358/256; 355/6; 358/257
[58] Field of Search ...................... 358/257, 256; 355/6

[56] References Cited

U.S. PATENT DOCUMENTS 3,997,873 12/1976 Thornton ................................. 355/6

FOREIGN PATENT DOCUMENTS 61-82572 4/1986 Japan .

Primary Examiner—Howard W. Britton
Attorney, Agent, or Firm—Burns, Doane, Swecker & Mathis

[57] ABSTRACT

A multi-functional imaging apparatus being operable in either one of various office automation modes such as copy mode, facsimile mode, printer mode and the like is disclosed. The multi-functional imaging apparatus is comprised of an image reading section, an image forming section and a communication section for transmitting and receiving image data. Plural card-like memory elements are provided for designating individual office automation modes. When a desirable card-like memory element is set into the imaging apparatus, the apparatus becomes operable in an office automation mode corresponding to the inserted memory element.

18 Claims, 16 Drawing Sheets

Fig. 3(I) Fig. 3(II) Fig. 3(III)
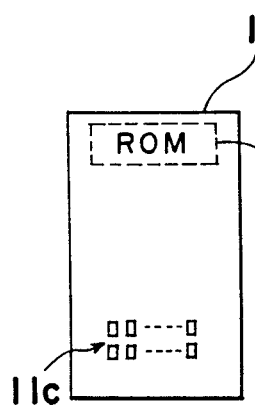 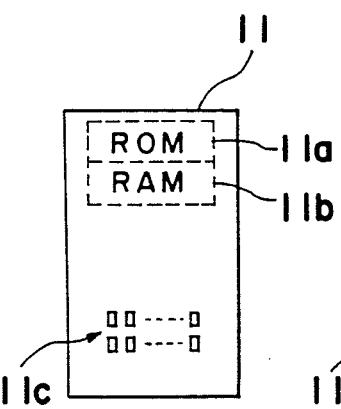 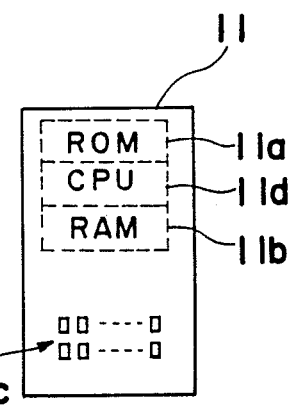
Fig. 4
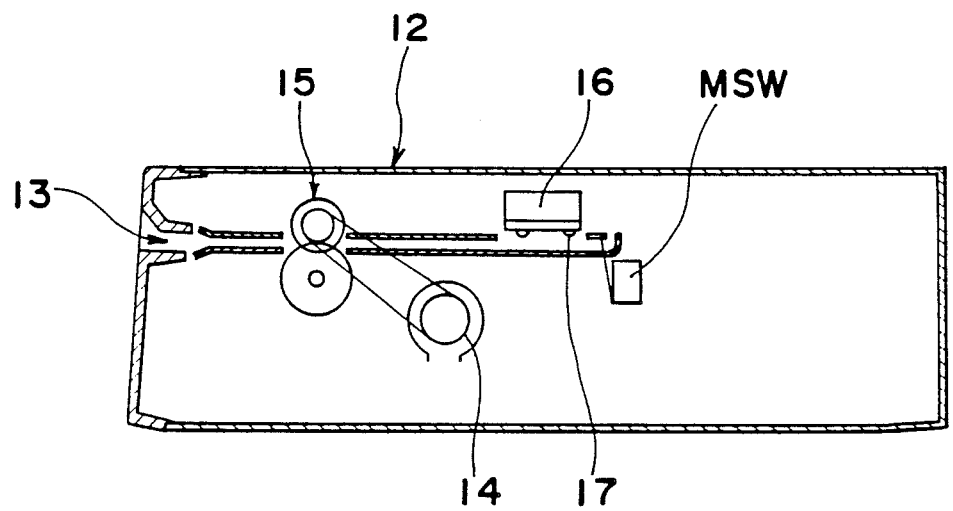

(b) IC card for Copy mode (a) NO IC card (d) IC card for Printer mode (c) IC card for Facsimile mode

MULTI-FUNCTIONAL IMAGING APPARATUS

BACKGROUND OF THE INVENTION

1. Field of the Invention

The present invention relates to a complex system being capable of operating as a copy machine, a printer or a facsimile in which an image reading portion and an image forming portion are separated mechanically and a communication function for image data is provided.

2. Description of the Prior Art

Generally speaking, a digital copy machine is mechanically divided into three portions, namely a portion for scanning a document, a portion for reading an image of a document and a portion for forming an image having been read in the reading portion which includes a paper feeding portion, a developing portion and a fixing portion.

In a system wherein individual image data having been read are transformed into electric signals, the image reading portion can be combined with the document scanning portion so as to form so-called image reader and, therefore, the copy machine is mechanically divided into an image reader and a printer. Further, if data communication function is provided in such a system mentioned above, document image having been read can be sent to the other party or document image having been sent from the other party can be outputted by the printer. Namely, so called facsimile function can be obtained in the system.

In a conventional complex system having multifunctions such as an image reader, a printer, a facsimile and the like, electrical signals having been read by the image reader are outputted to the printer directly in the copy-mode thereof and, in the transmission mode of the facsimile, signals from the image reader are outputted, via a modem, to a communication line. In the receiving mode of the facsimile, signals sent through a communication line are inputted, via the modem, to the printer. In the printing mode of the system, information data obtained by the image reader or input through a keyboard are processed in a controller so as to be able to print out by the printer.

In the system mentioned above, the image reader, key-board, printer and modem are controlled by a controller. Control for internal operations of individual portion is executed with use of control programs provided therefor and data-communication between or among them and timing control are also controlled by control programs.

Contrary to the above, there has been known a copy machine in which various copy conditions can be set with use of a memory card. For example, in Japanese Patent Application 57-27846, a copy amount available to each of individual sections is pre-set or a residual copy amount can be checked with a card into which a function code assigned for a machine keeper is recorded. Also, the copy machine is allowed to operate when a card in which a section code has been recorded is used and a number of copies is subtracted from the preset copy amount to memorize a residual copy amount into a memory provided in the controller. However, the card memorizes only a function code or a section code and cannot designate either one of functions provided in the copy machine.

In Japanese Laid-Open patent application (JP-A) 59-121353 or JP-A 59-200267, a combination of various copy conditions for the copy machine such as a copy magnification, a copy size, a copy density, page alignment, duplex copy mode and so on, namely all copy conditions other than a number of copies, is automatically set by a format sheet to which individual copy conditions are recorded. However, the card or sheet of this type is intended to designate only copy conditions and it is impossible to select or designate an operation mode such as a copy machine, a printer or a facsimile.

Further, in JP-A 59-121067, a key sheet is used upon using an automatic document feeder (ADF) which is set before the first page of each group of documents to be copied. This key sheet is provided for designating individual copy conditions such as a copy size, a copy magnification, a number of copies, duplex copy mode and so on in which a permission code for using the copy machine or a code of a keeper of the copy machine is recorded together with necessary copy conditions. When the key sheet is used, copy conditions are designated automatically and a total copy amount of every user is indicated by a display means. This key sheet is limited to set together with documents to be copied in which only various codes for setting copy conditions are recorded.

As mentioned above, even in the copy machine, various copy conditions such as a copy magnification, a copy size, a copy density, duplex copy mode and so on have to be set before starting a copy operation. Accordingly, an operation panel of the copy machine becomes very complicated and hard to operate. In a complex system having various modes such as copy mode, print mode and facsimile mode, an operation panel thereof becomes much more complicated since individual conditions in every mode must be designated. This involves operational errors.

If all of programs necessary for controlling individual modes of the complex system are provided in a controller thereof, control programs become very complicated, volume thereof becomes very bulky and the internal construction of the controller becomes very complicated.

SUMMARY OF THE INVENTION

One object of the present invention is to provide a multi-functional imaging apparatus in which individual functions of the apparatus can be designated one to one by plural card-like memory means.

Another object of the present invention is to provide a multi-functional imaging apparatus in which desirable use conditions in an office automation mode can be set with use of a card-like memory means without accompanying complex key operation.

Further object of the present invention is to provide a multi-functional imaging apparatus in which a control program to be provided for controlling the apparatus can be simplified and minimized in volume thereof.

One more object of the present invention is to provide a multi-functional imaging apparatus which operates in an office automation mode designated by a card-like memory means when it is set in the apparatus and, when it is not set therein, operates automatically in a predetermine office automation mode.

Another object of the present invention is to provide a multi-functional imaging apparatus in which individual use conditions in each office automation mode can be registered into a card-like memory means.

BRIEF DESCRIPTION OF DRAWINGS

These and other objects and features of the present invention will become more apparent when the preferred embodiment of the present invention is described in detail with reference of accompanied drawings in that;

FIG. 3(I), 3(II) and 3(III) are plan views for showing various IC cards to be used in the multi-functional imaging apparatus;

FIG. 4 is a schematical sectional view of a device for reading an IC card and writing data thereinto;

DESCRIPTION OF THE PREFERRED EMBODIMENT

Figure 1:
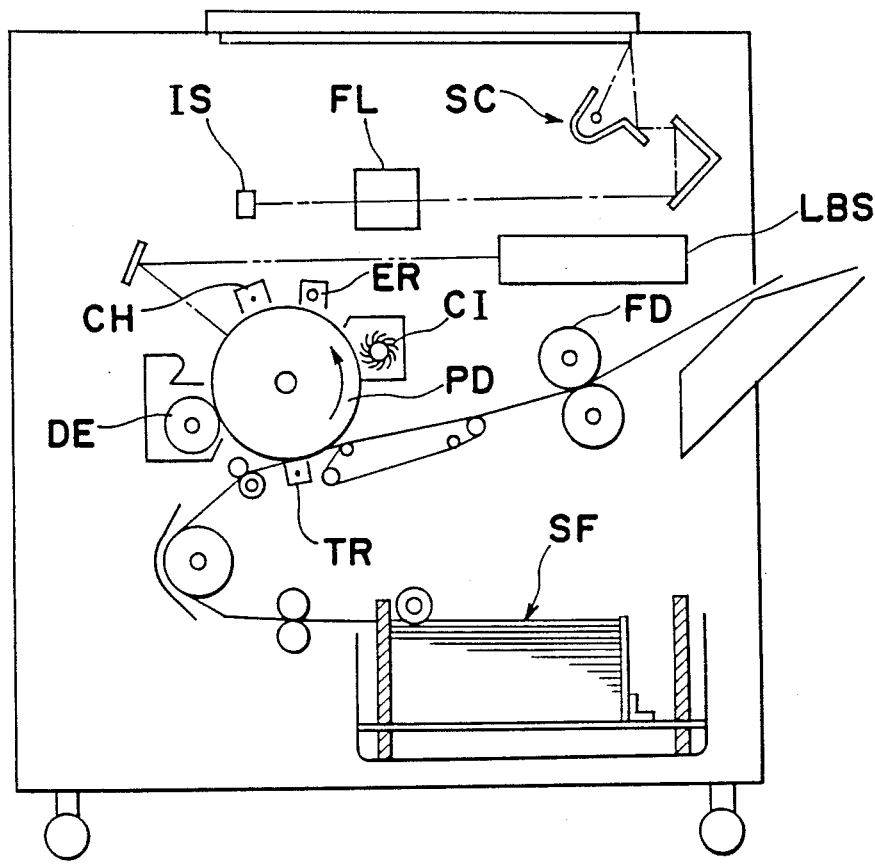
FIG. 1 is a schematical sectional view of a multifunctional imaging apparatus according to the present invention.

FIG. 1 shows a schematic construction of a multifunctional imaging apparatus according to the present invention.

The imaging apparatus provides an image reading section arranged in the upper space of a main body thereof and an image forming section arranged beneath the image reading section. The image reading section is comprised of a scanning system SC for scanning a document put on a document platen, a focusing lens assembly FL and an image sensor IS being comprised of a CCD (charge coupled device) linear array. The image sensor IS transforms document image of one line into image signals.

The image forming section is comprised of a laser beam scanner LBS, a photoconductive drum PD and a sheet feeding portion SF. Around the photoconductive drum PD, a cleaner CL, an eraser ER, a charger CH, a developing device DE and a transfering charger TR are arranged.

As is well-known to those skilled in the art, when the photoconductive drum PD is exposed by laser beam emitted from the laser beam scanner LBS according to image data which may have been read by the image sensor IS, a latent image is formed on the surface of the drum PD. The latent image is developed with toner by the developer DE. The toner image formed on the drum is transferred to a sheet by the transferring charger TR. The image transferred to a sheet is fixed by a fixing device FD.

Figure 2:
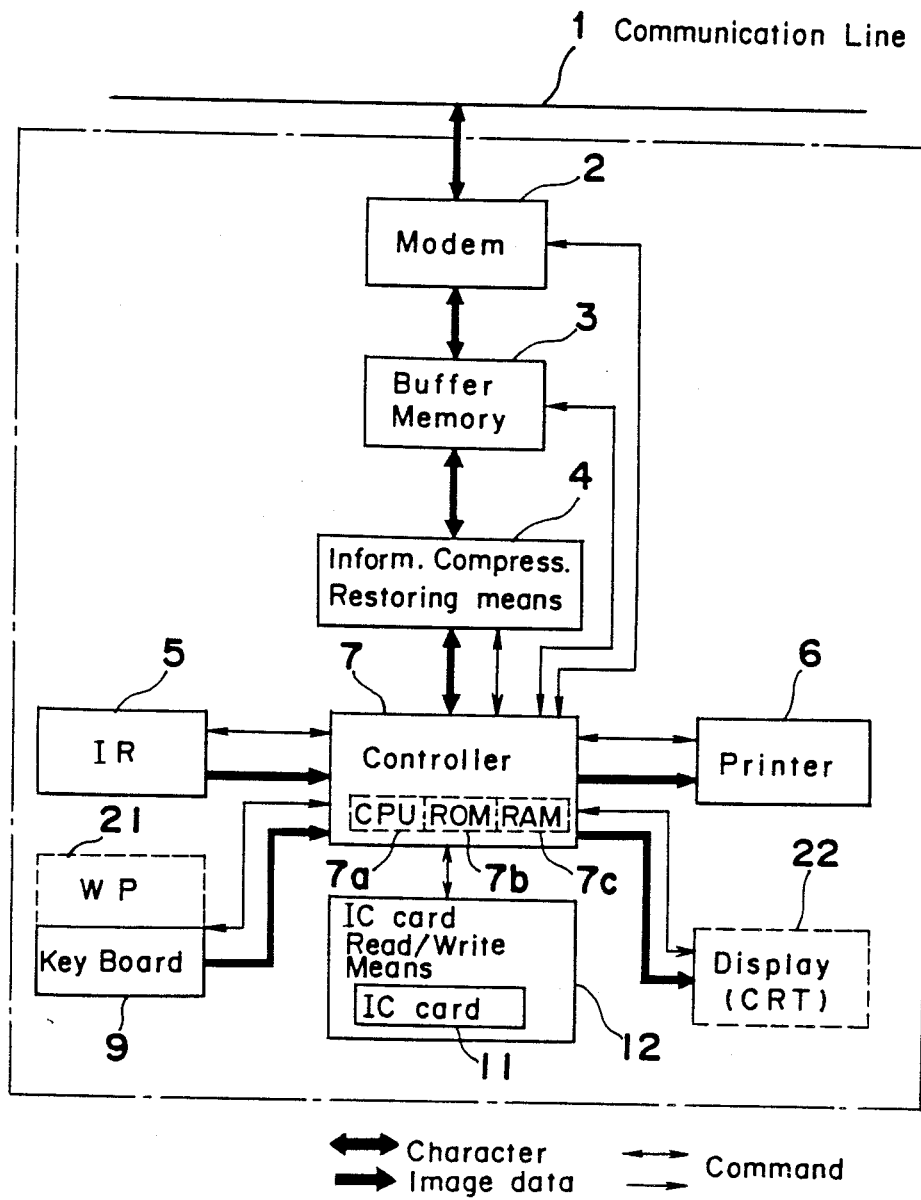
FIG. 2 is a block diagram of the multi-functional imaging apparatus.

FIG. 2 is a block diagram of the multi-functional imaging apparatus according to the present invention.

The imaging apparatus has a facsimile system being comprised of a modem 2, a buffer memory 3 and an information compression-restoration means 4, a copy system which forms an image having been read by an image reader 5 by a printer 6 and a print system which forms an image by the printer based on image data sent from a host computer, a word-processor or the like. The modem 2 is connected to a communication line 1. The buffer memory 3 is provided so as to be able to access image data even if the printer 6 is in use in the copy mode. The information compression-restoration means 4 is provided for compressing communication data or restoring compressed data. This means 4 can be omitted in the case that only a local communication is done without use of a commercial communication line.

A controller 7 for controlling the imaging apparatus is substantially comprised of a central processing unit (CPU) 7a, an external ROM (Read Only Memory) 7b and an external RAM (Random Access Memory) 7c and is related to an operation panel arranged on the upper board of the main body. The controller 7 controls individual devices 2 to 6 based on various instructions input by keys of an operation panel or of a key board 9 of the host computer.

In the imaging apparatus according to the present invention, a read-write device 12 is provided for reading contents of an IC (integrated circuit) card 11 and for writing a personal use method into the IC card 11. Further, a word processor 21 and a display 22 can be connected to the controller 7.

Three types of IC cards can be used as IC cards 11 as shown in FIGS. 3(I), 3(II) and 3(III). The IC card of the first type has a ROM 11a and contacts 11c formed on a substrate thereof.

The IC card 11 of the second type has a ROM 11a and a non-volatile RAM 11b together with contacts 11c. The IC card 11 of the third type has a ROM 11a, a non-volatile RAM 11b and a central processing unit 11d together with contacts 11c. In place of the non-volatile RAM 11b, an EEPROM (electrically erasably programmable ROM) can be used.

IC cards are classified into three kinds corresponding to three operation modes of copy mode, facsimile mode and printer mode. Respective program corresponding to each operation mode is stored in the ROM 11a of the IC card 11.

Meanwhile, three fundamental control programs comprised of two check programs for checking contacting relations in the imaging apparatus and for executing security check thereof upon switching on a power supply for the imaging apparatus and a program for preparing an access of an IC card at the side of the controller when the IC card is set and one more program minimally necessary for the receiving mode of the facsimile are stored in the ROM 7b of the controller 7. As will be apparent from contents of programs stored in the ROM 7b of the controller 7, the imaging apparatus does not work other than in the facsimile receiving mode if any IC card is not set.

FIG. 4 is a schematic sectional view of the card read/write device 12 which is arranged at a corner of the upper wall of the main body.

When an IC card 11 is inserted into an insertion slit 13, a motor 14 is started to drive a pair of rollers 15 provided for drawing into or back the IC card 11. When the IC card 11 is fully drawn into an inner space of the read/write device 12, a micro-switch MSW is switched on by the IC card 11 and, then, the motor 14 is stopped. In the card read/write device 12, a read/write head 16 is provided and, when the IC card 11 is fully inserted, the read/write head 16 reads the contents stored in the IC card 11 through contacts 17 which are arranged to contact with contacts 11c of the IC card 11 or writes necessary data thereinto. Upon drawing back the inserted IC card 11, the motor 14 is driven in a reverse direction to eject it by the pair of rollers 15.

Figure 5:
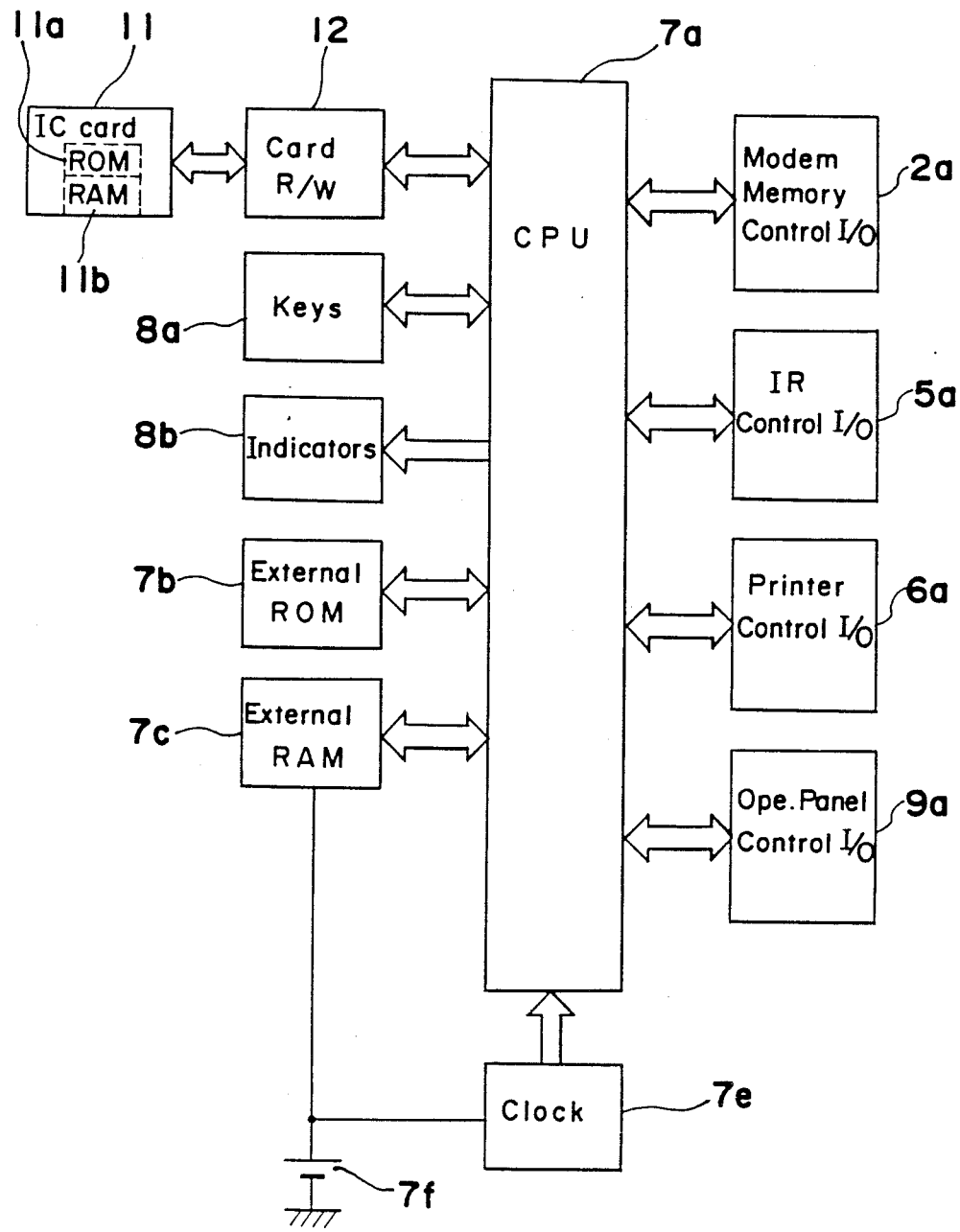
FIG. 5 is a block diagram for showing connection relation of a CPU with various devices provided for the multi-functional imaging apparatus.

FIG. 5 shows a block diagram of the control system. The card read/write device 12, keys and switches 8a of the operation panel 8, LED indicators 8b thereof, the external ROM 7b and the external RAM 7c are connected with the CPU 7a. Control input/output ports 2a of the modem 2 and the buffer memory 3, I/O ports 5a of the image reader 5, control I/O ports 6a of the printer 6 and control I/O ports 9a of the key board 9 are also connected with the CPU 7a. The external RAM 7c is backed up by a battery 7f so as to maintain data memorized therein even if the power supply is switched off. A clock 7e is also backed up by the battery 7f.

In the present preferred embodiment, only the controller 7 has the CPU 7a for controlling the system. However, individual devices such as the image reader 5, the printer 6, the modem 2 and/or the like can have there own CPUs respectively. In such a case, individual CPUs are controlled by the main CPU 7a of the controller 7.

Figure 6:
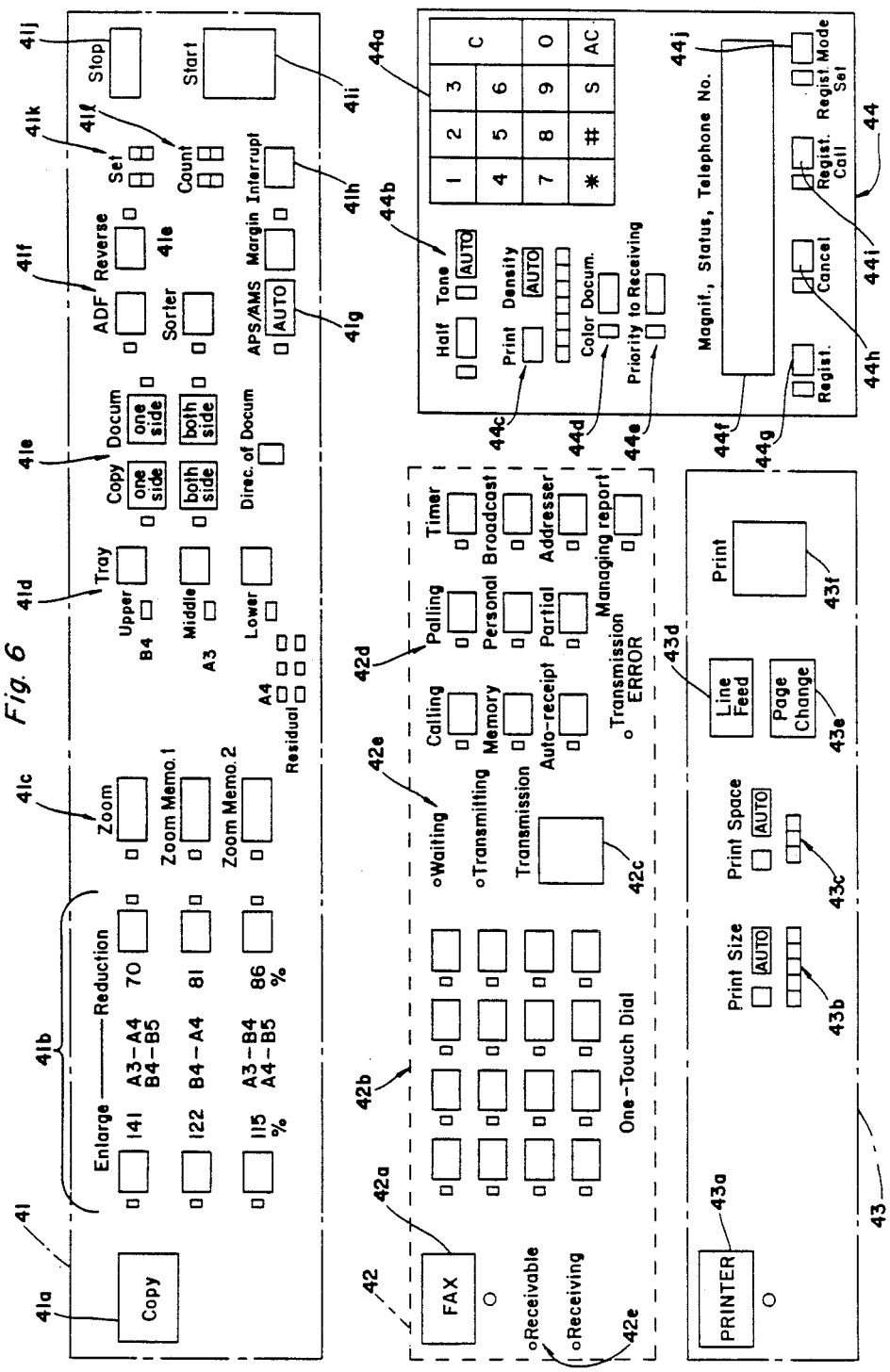
FIG. 6 is a plan view of an operation panel of the multi-functional imaging apparatus.

FIG. 6 shows an operation panel 8. The operation panel 8 is sectioned into four portions 41 to 44. Individual portions are clearly shown in FIGS. 7, 8 and 9, respectively.

Figure 7:
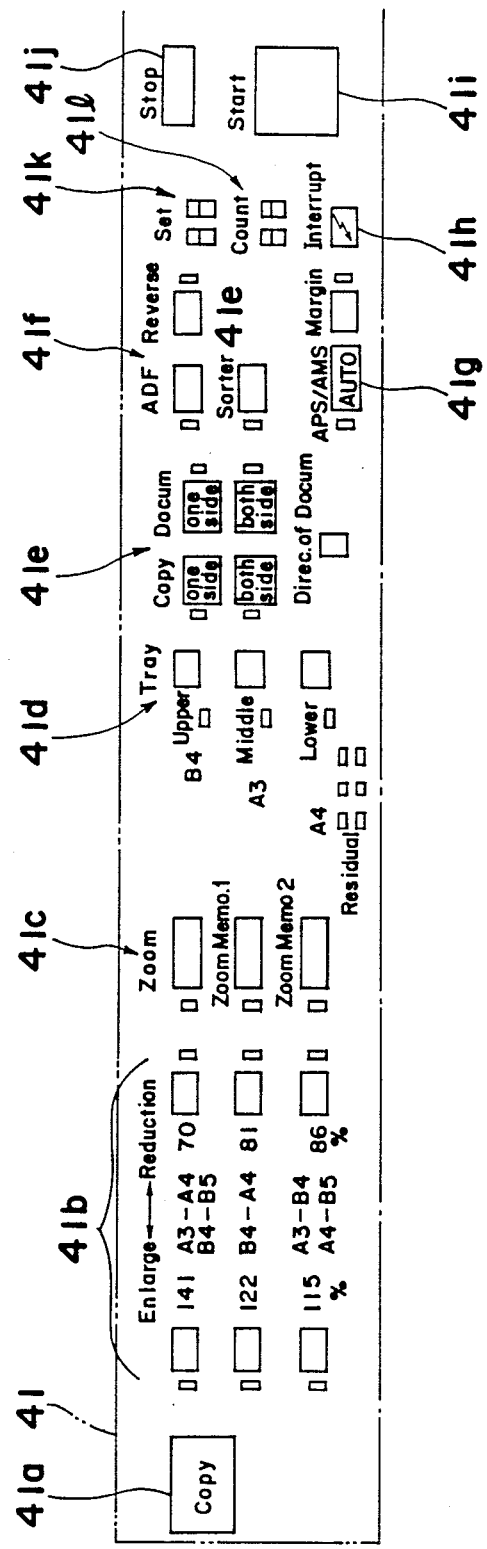
FIG. 7 is an enlarged plan view of the first portion of the operation panel.
Figure 8:
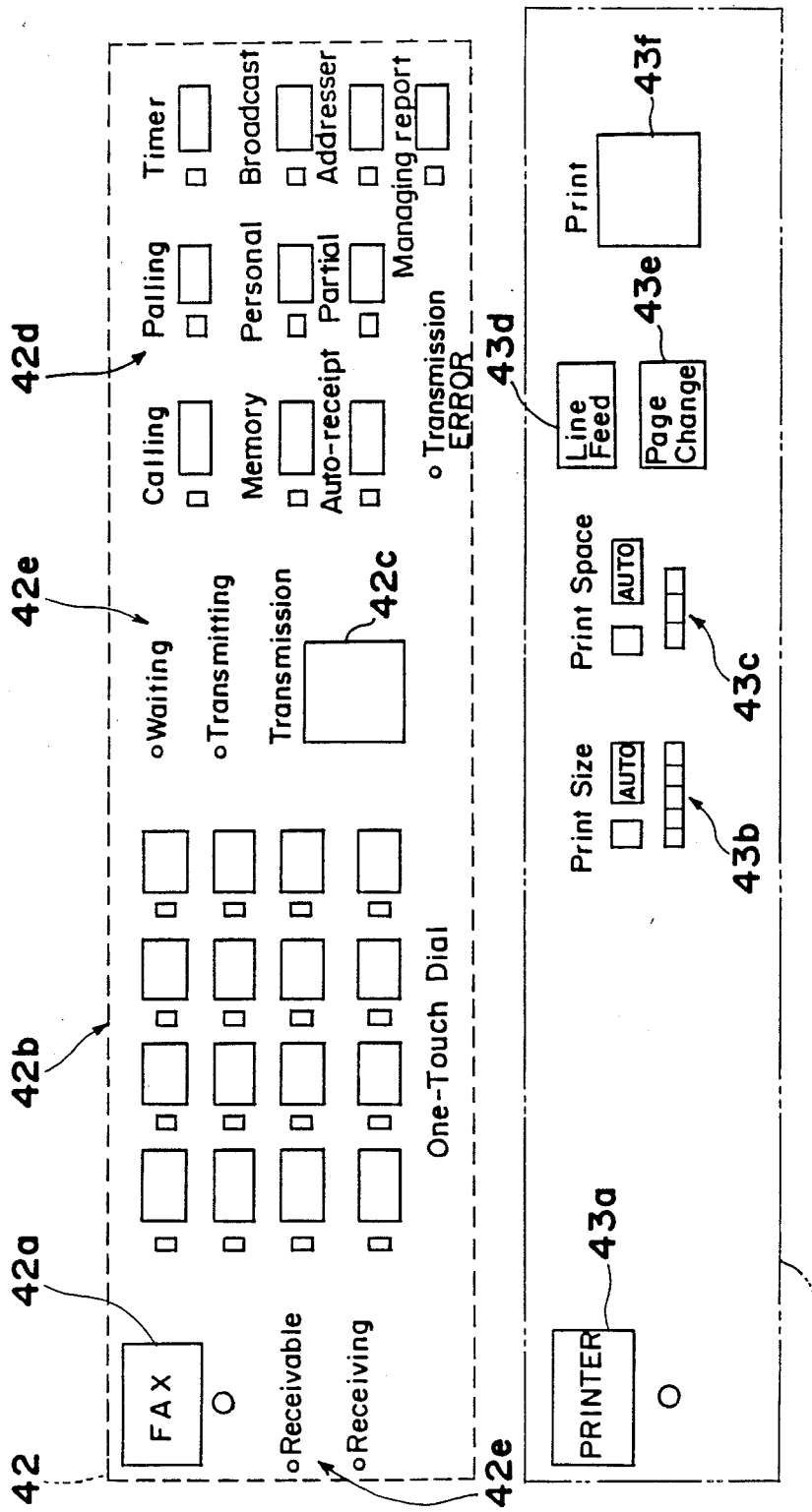
FIG. 8 is an enlarged plan view of the second and third portions of the operation panel.
Figure 9:
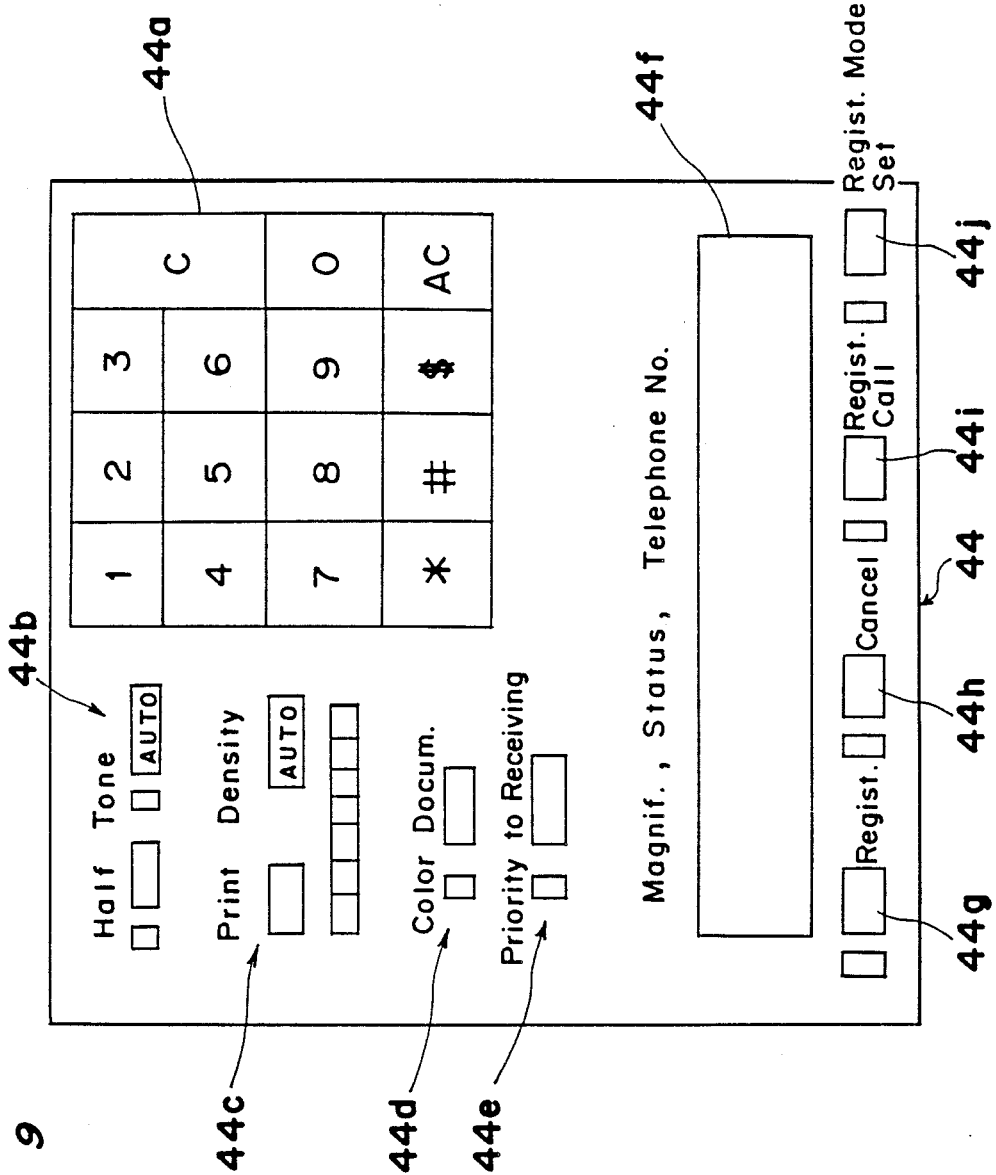
FIG. 9 is an enlarged plan view of the common portion of the operation panel.

As shown in FIGS. 6 and 7, the first portion 41 is provided for the copy mode and, therefore, various keys and indicators are arranged thereon. The second portion 42 is assigned to the facsimile mode and the third portion 43 is assigned to the printer mode, as shown in FIG. 8. The fourth portion 44 is assigned to a portion common to these three modes, as shown in FIG. 9.

The first portion 41 for the copy mode provides keys and indicators corresponding to respective keys as follows;

Copy mode selection key 41a, Key group 41b for designating fixed copy magnification, Zooming keys 41c, Copy size designation keys 41d, Keys 41e for designating either of one side and both sides with respect to a document and a copy paper, Selection keys 41f for designating individual optional apparatuses such as the ADF, the sorter and the like, Selection key 41g for selecting APS (auto-paper selection) mode or AMS (auto-magnification selection) mode, Interruption copy key 41h, Copy start key 41i, Stop key 41j, Numeric indicator 41k of two figures for indicating a number of copies having been set and Counter indicator 41l for showing a number of copies at the present time.

As shown in FIG. 8, on the second portion 42 for the facsimile mode, Facsimile mode designation key 42a, One-touch dial keys 42b, Transmission key 42c, function keys 42d related to various functions needed for the facsimile mode, indicators 42e for showing "receivable", "receiving", "waiting", "transmitting" and so on are arranged.

On the third portion 42 for the printer mode, Printer mode selection key 43a, Print size designation keys 43b, Print space designation keys 43c, Line feed key 43d, Page change key 43e and Print start key 43f are arranged.

FIG. 9 shows the fourth portion 44 for operations common to respective modes. This fourth portion 44 provides Ten keys 44a, Half-tone designation keys 44b, Print density designation keys 44c, Color document designation key 44d, Key 44e for giving priority to the receiving mode of the facsimile, Liquid crystal display 44f for displaying a magnification, a status and a telephone number, Registration key 44g, Cancel key 44h, Calling key 44i for calling registered data and Registration mode set key 44j are arranged.

When an IC card for the copy mode is set into the card read/write device 12, the second portion 42 for the facsimile mode and the third portion 43 for the printer mode are made inactive by the control program. Ten keys 44a of the common portion 44 are used as keys for inputting a desired number of copies and the liquid crystal display 44f is used for displaying a magnification and a number of copies having been set in the copy mode.

When an IC card for the facsimile mode is set into the card read/write device 12, the first portion 41 for the copy mode and the third portion 43 for the printer mode are made inactive, ten keys 44a are made function as dial keys and the liquid crystal display 44f is used to display a telephone number to be connected and an address thereof.

When an IC card for the printer mode is set into the card read/write device 12, the first and second portions 41 and 42 are made inactive, ten keys 44a are used as keys for setting a page number of a document to be printed and the display 44f is used for displaying a page number of a document being printed presently.

Respective indications for warning "jam", "toner empty", "paper empty" and the like which are common to all modes can be displayed on the display 44f when either one of them is caused in the state that any IC card is not set.

The registration key 44g is pushed down upon registering desirable use conditions in either of three modes to an IC card. Namely, if an operator wishes to register use conditions desirable for him, he operates the registration key 44g after setting desirable use conditions with use of the operation panel 8 in a state wherein an IC card for the copy mode, for the facsimile mode or for the printer mode is set into the card read/write device 12. When the registration key 44g is pushed down, data regarding the desirable use conditions are written into the IC card by the card read/writer device 12 having a function for writing data to the IC card inserted therein. For example, when an IC card 11 for the copy mode is set and use conditions such as a copy paper size of A4 (set in the longitudinal direction thereof), a copy magnification of 0.707, an autoexposure mode, a document of one side and a one side copy mode are designated, these data are written into the IC card 11. However, it is to be noted that a number of copies is not registered upon registration of the use conditions for the copy mode since it is always changed.

When an IC card for the facsimile mode is set, a telephone number, a client code and the like are registered. If an IC card for the facsimile mode is set, printing size and space are registered.

In the present system, plural sets of use conditions can be registered to one IC card. Upon registration of these sets of use conditions, individual numbers of them are registered by operating the registration mode set key 44j and one of ten keys 44a in turn. Namely, a registration number is designated by operating one of ten keys 44a after pushing down the registration mode set key 44j and, thereafter, the registration key 44g is pushed down for registering a set of use conditions. The cancel key 44h is used for cancelling the registration of use conditions having been registered once. In this case, a registration number of a set of use conditions to be cancelled is designated at first by operating the registration mode set key 44j and one of ten keys 44a in turn and, then, the cancel key 44h is pushed down.

Upon using an IC card into which individual sets of use conditions have been registered, the IC card is inserted into the card read/write device 12 at first and the desired use conditions are set by operating one of ten keys to designate the registration number after operating the registration call key 44i. The registration number and registered use conditions are indicated on the display 44f.

Figure 10:
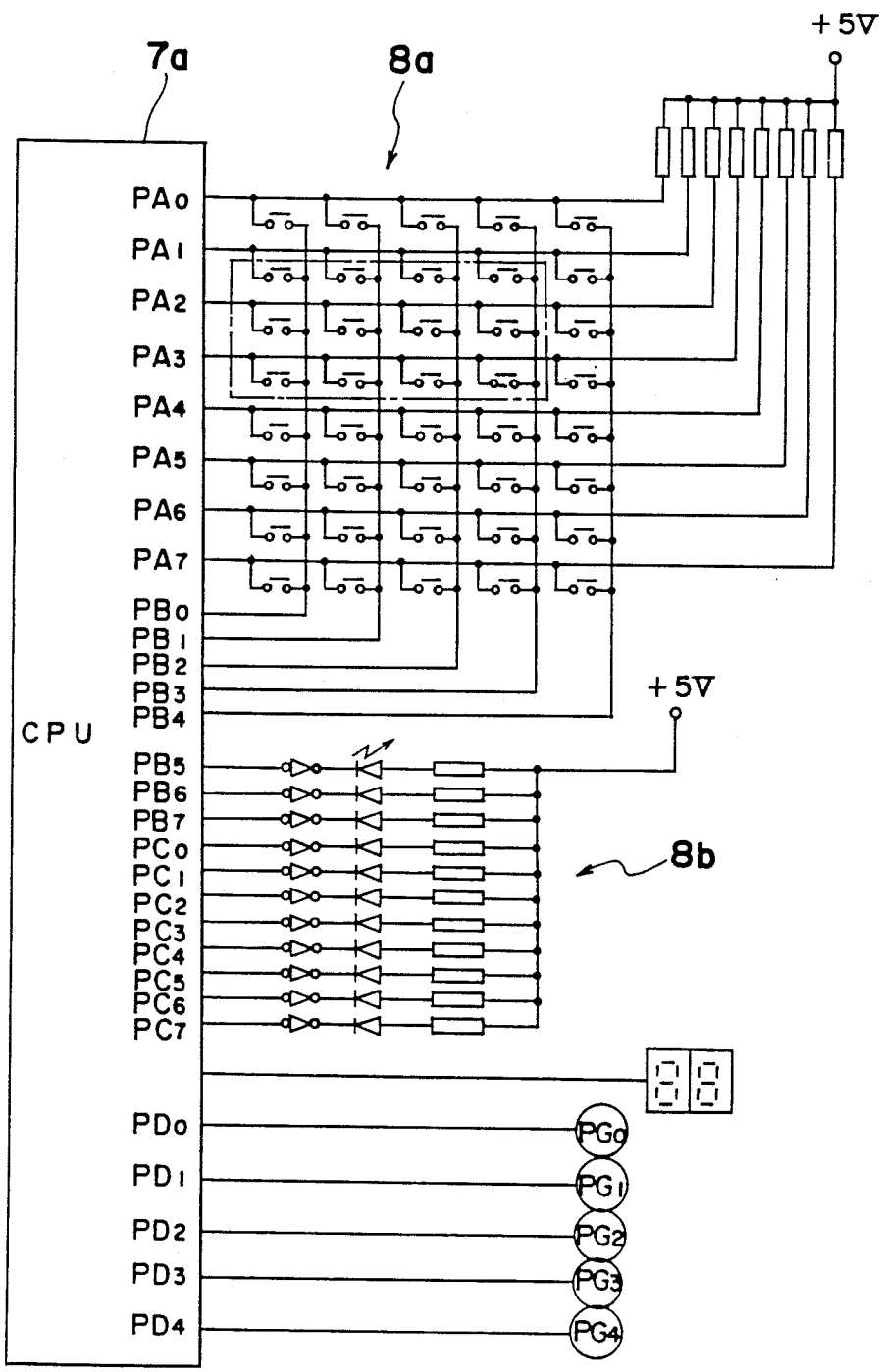
FIG. 10 is an enlarged view for showing individual ports of the CPU connected to respective keys, indicators and other devices.

FIG. 10 shows a connection relation of the CPU 7a with key switches 8a and LED indicators 8b provided on the operation panel 8.

Ports from $PA_0$ to $PA_7$ are input-ports for entering data designated by operating individual keys of the operation panel 8. Ports from $PB_0$ to $PB_4$ are output-ports corresponding to key entry data. Ports from $PB_5$ to $PB_7$ and from $PC_0$ to $PC_7$ are output-ports for turning on or off individual LED indicators such as a paper size indicator, an indicator for indicating the duplex copy mode and for driving the liquid crystal display for indicating a telephone number of a client and so on. Ports from $PD_0$ to $PD_4$ are connected to input/output ports $PG_0$ to $PG_4$ of the card read/write device 12 in a manner of one to one to read programs and information stored in the ROM 11a and the RAM 11b of the IC card 11 by the CPU 7a and/or to write information from the CPU 7a into the RAM 11b of the IC card 11.

The CPU 7a controls the operational mode of the operation panel 8 according to the mode designated by the inserted IC card and the internal operational mode corresponding thereto according to programs stored in the ROM of the CPU and the ROM 11a of the IC card 11.

Figure 11A:
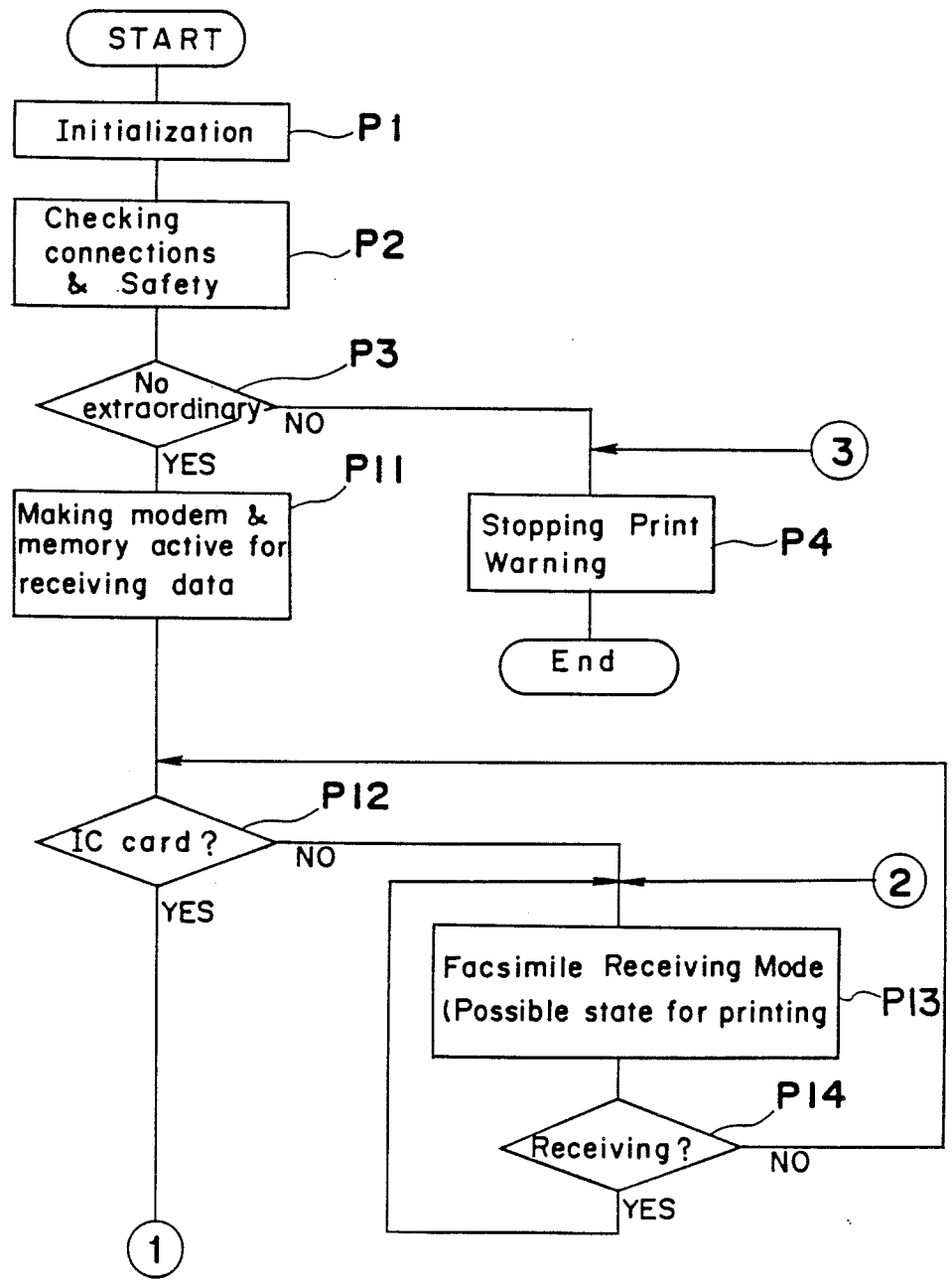
FIGS. 11a and 11b show a flow chart of a main control program to be executed by the CPU of the apparatus.
Figure 11B:
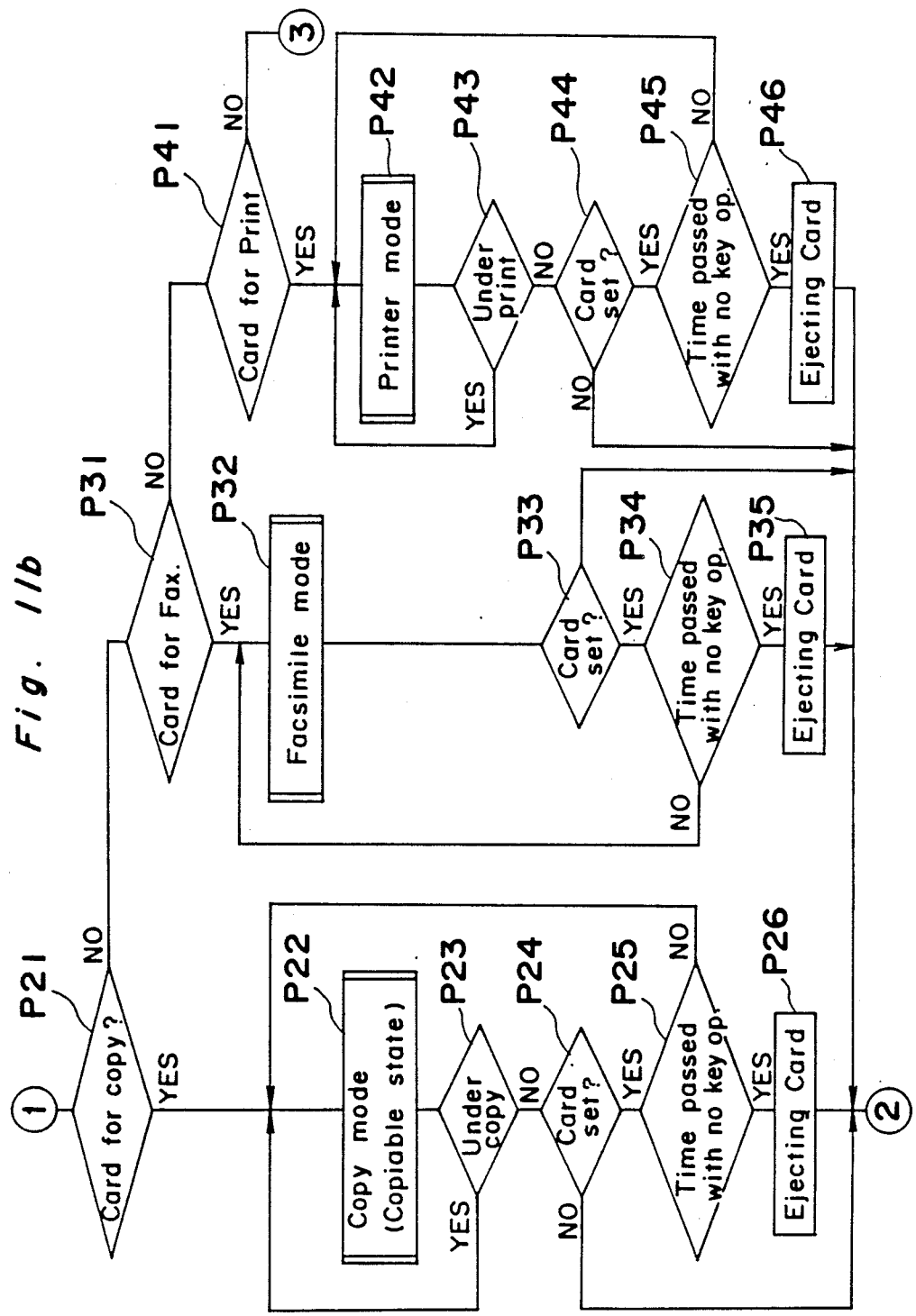

FIGS. 11a and 11b show a flow chart of the main program to be executed by the CPU 7a.

When a power switch (not shown) is switched on, the system is initialized at step P1 and, then, connection relations and safeties of individual parts are checked at step P2. If something is wrong with a part such as a high voltage unit in the printer at step P3, the system is stopped to indicate a warning at step P4. If there is not found something wrong at step P3, the modem 2 and the buffer memory 3 are made active to receive data transmitted through the communication line 1 and to store received data in the buffer memory 3 at step P11.

Figure 12B:
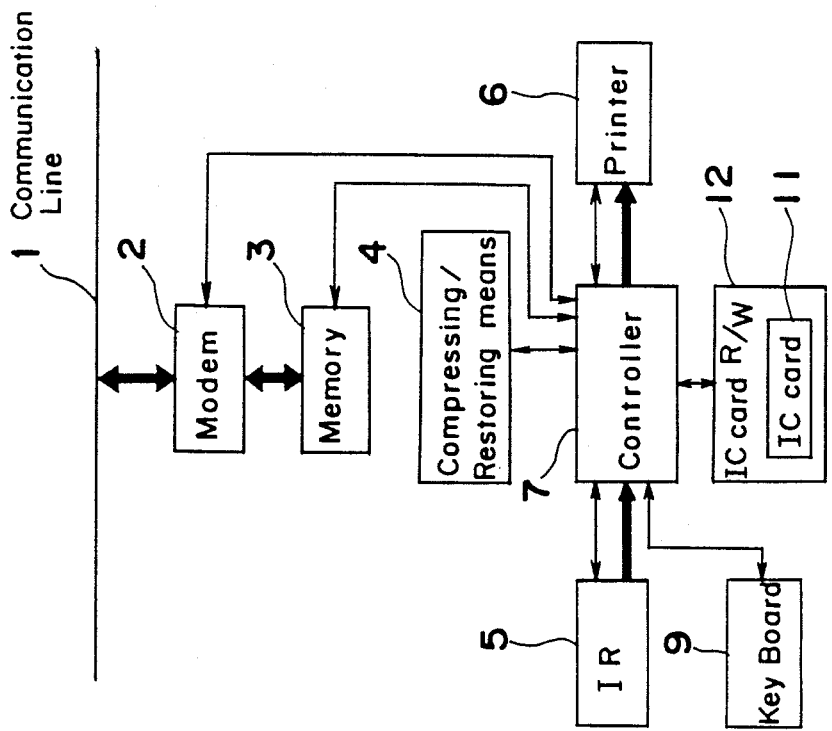
FIGS. 12a, 12b, 12c and 12d are explanatory views for showing connection relations in respective operation modes.
Figure 12A:
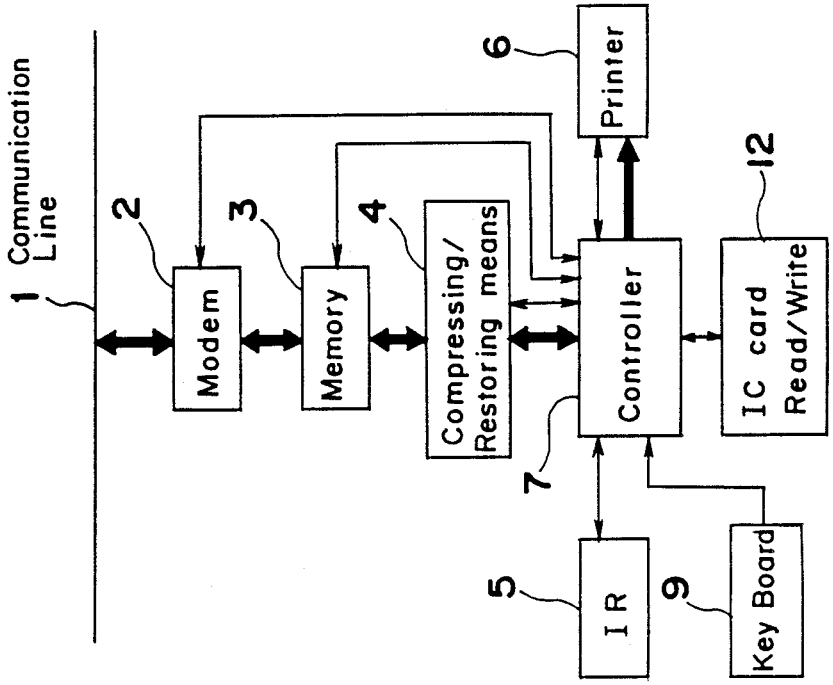

Next, existence of an IC card in the card read/write device 12 is checked at step P12. If any IC card 11 is not inserted in the card read/write device 12, the mode of the system is set to the facsimile mode at step P13. In the facsimile mode, the modem 2, the buffer memory 3, the information compressing and restoring apparatus 4 and the printer 6 are made active by the controller 7 as shown in FIG. 12a. Accordingly, received data are printed out by the printer 6. Meanwhile, communication lines of the image reader 5 and the key board 9 between the controller 7 are made inactive. If the state is in the data receiving state (YES at step P14), the receiving mode of the facsimile is kept continued. If not, the process returns to step P12.

If it is decided that an IC card 11 is inserted in the card read/write device 12 at step P12, it is checked whether the IC card is one for the copy mode or not at step P21. If it is for the copy mode, the system is switched to the copy mode at step P22. In the copy mode, the image reader 5 and the printer 6 are directly connected for copying operation. As shown in FIG. 12b, data lines from the buffer memory 3 to the controller 7 nd from the key board 9 to the controller 7 are made inactive while data lines from the communication line 1 to the buffer memory 3 are kept active for receiving data from the communication line 1.

Figure 13:
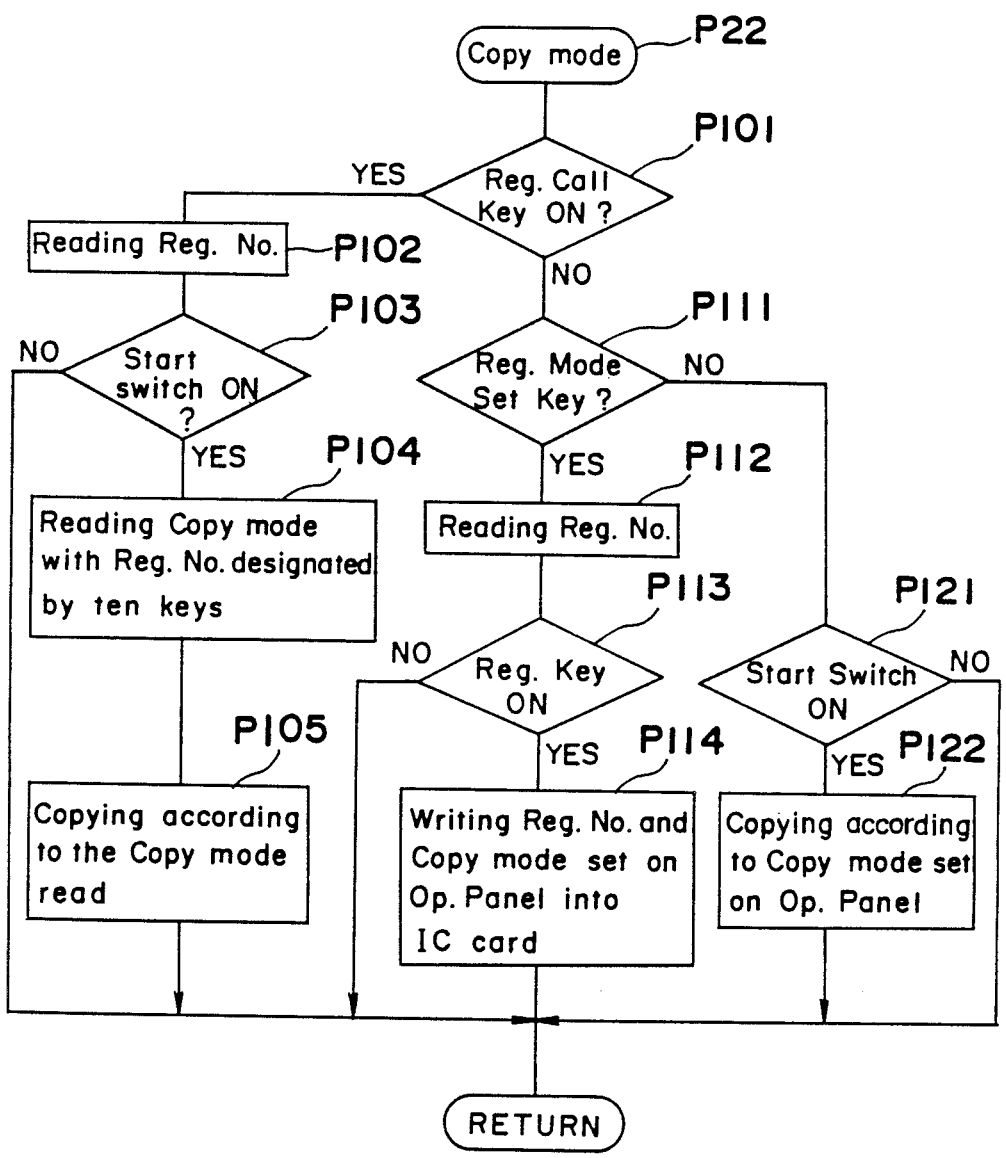
FIG. 13 is a flow chart of a program to be executed in the copy mode.

FIG. 13 shows a flow chart of a subroutine P22 for the copy mode. If the registration call key 44i is pushed down (YES at step P101) and a registration number is designated by operating one of ten keys 44a at step P102, data regarding a registered set of use conditions designated by the registration number are read into the CPU 7a. When the start key 41h for the copy mode is pushed down at step P103, one copy operation is executed at step P105 according to the copy mode with the use conditions having been read into at step P104.

If the registration call key 44i is not operated (NO at step P101) but the registration mode set key 44j (YES at step P111) is operated, a registration number designated by one of ten keys 44a is read at step P112. When the registration key 44g is operated after setting desired use condition with use of the operation panel (YES at step P113), the desired use conditions are registered in the IC card 11 together with the registration number at step P114.

If neither the registration call key 44i nor the registration mode set key 44j are operated, a copy operation is executed according to use conditions set with use of the operation panel at step P122 when the copy start button 41i is pushed down at step P121.

Returning now to FIG. 11b, if the IC card 11 is kept inserted for a predetermined time interval without any key operation (at step P25), the IC card 11 is automatically ejected at step P26 and the mode of the system is automatically switched back to the facsimile receiving mode at step P13.

If it is decided at step P21 that the inserted IC card is not for the copy mode, it is checked whether the inserted IC card is for the facsimile mode at step 31. If it is so, the system is brought into the facsimile mode at step P32. Namely, a subroutine provided for the facsimile mode is executed thereat.

Figure 12D:
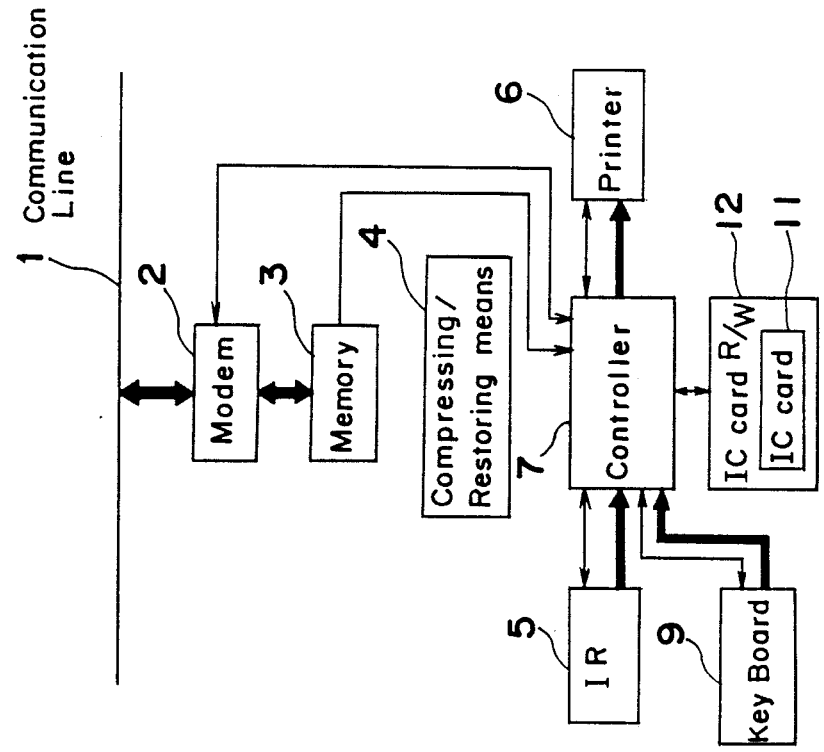
Figure 12C:
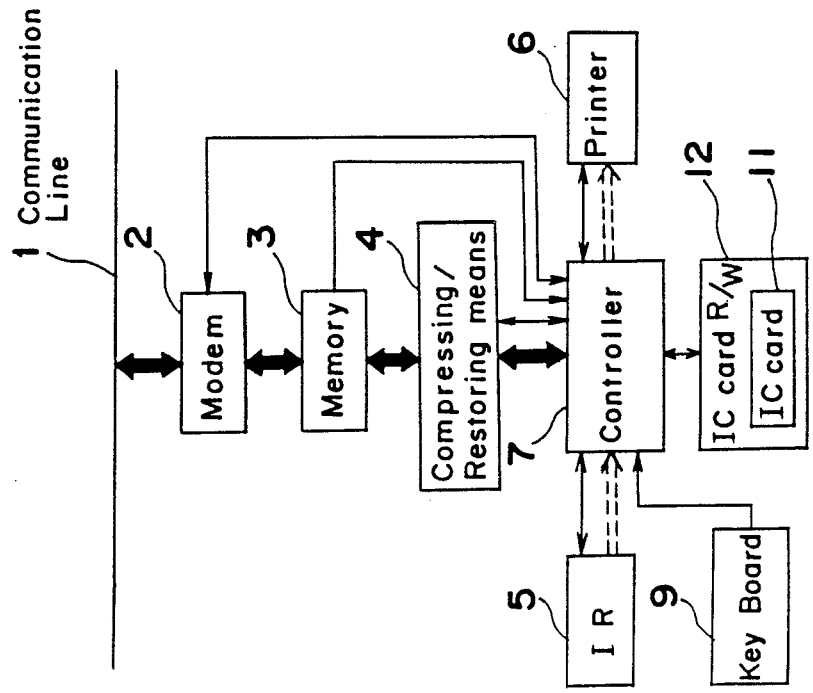

In this facsimile mode, data lines from the communication line 1 to the controller 7 are connected while the key board 9 is disconnected to the controller 7 as shown in FIG. 12c.

Figure 14:
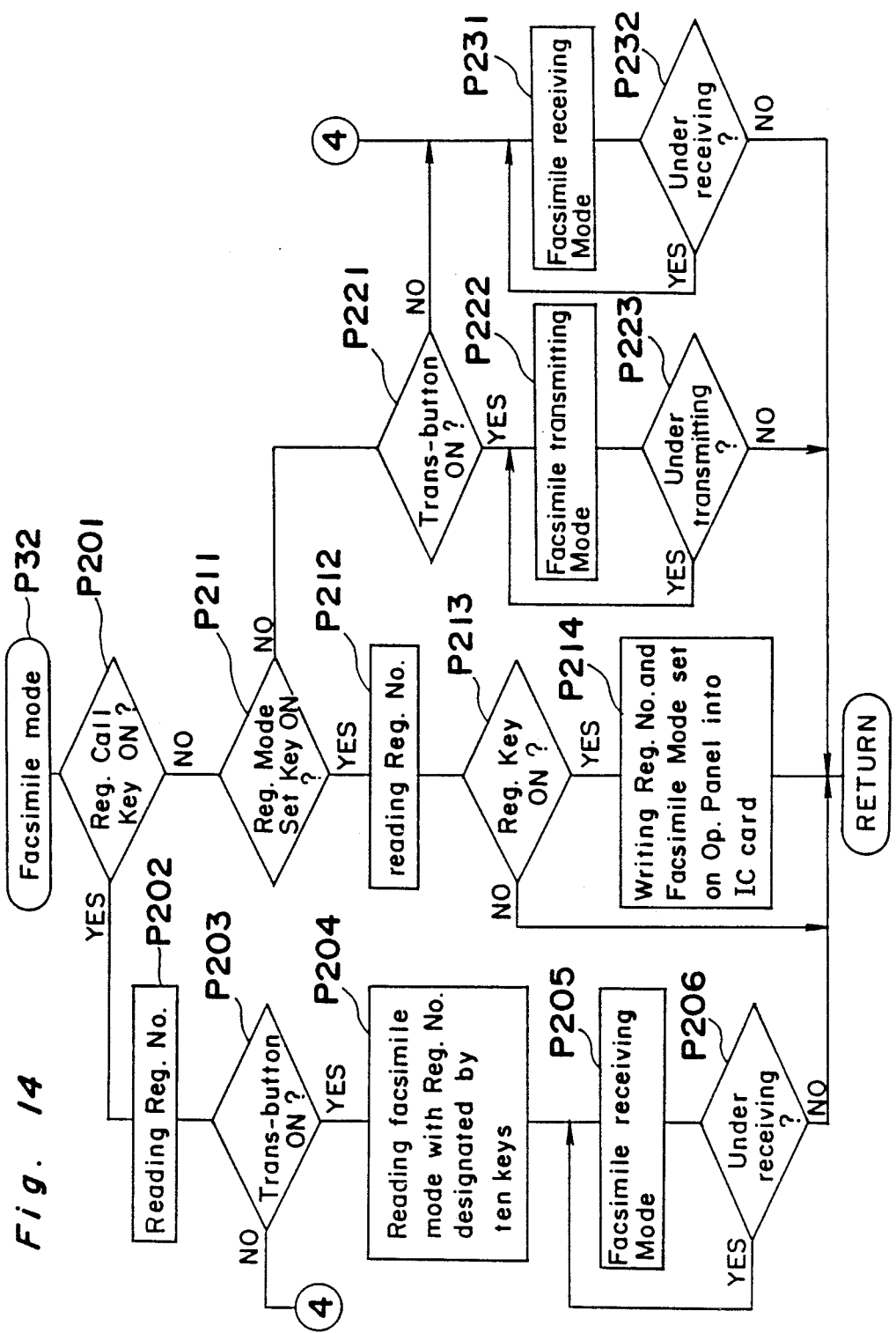
FIG. 14 is a flow chart of a program to be executed in the facsimile mode.

FIG. 14 shows a flow chart of the subroutine of the facsimile mode.

When the registration call key 44i is pushed down at step P201 and, then, one of ten keys 44a is operated in order to designate a registration number, the registration number is read at step P202. When the transmission button 42a is pushed down at step P203, one of plural sets of use conditions which is identified by the entered registration number is read into at step P204. Accordingly, the system is set to the facsimile transmitting mode at step P205.

If the registration call key 44*i* is not operated but the registration mode set key 44*i* is operated at step P211, a registration number entered with use of one of ten keys 44*a* is read at step P212. Thereafter, if the registration key 44*g* is pushed down at step P213, the entered registration number and use conditions set by operating the operation panel 8 are written or registered into an IC card 11 at step P214.

If neither the registration call key 44*i* nor the registration mode set key 44*j* are pushed down, a facsimile transmission mode which is designated by input data entered with use of the operation panel 8 is set at step P222 when the transmission button 42*a* is pushed down at step P221. Namely, image data are transmitted according to the facsimile transmitting mode having been set.

As shown in FIG. 12*c*, the data line from the image reader 5 to the controller 7 is kept connected in the facsimile transmitting mode. Therefore, image data read by the image reader 5 are transmitted when the transmission button 42*a* is pushed down. Any receiving mode is prohibited during the transmission by disconnecting the printer 6 to the controller 7.

When image data is transmitted from the other party in a state that the transmission button 42*a* is not pushed down (at step P203 or P221), the printer 6 is connected to the controller 7 and the system is switched into the receiving mode at step P231. The image reader 5 is kept disconnected to the controller 7 until the receipt of data is completed at step P232.

Returning to FIG. 11*b* if the IC card 11 is kept inserted for a predetermined time interval without any key operation, the IC card 11 is automatically ejected (at steps 33, 34 and 35) and the mode of the system is automatically switched back to the facsimile receiving mode (step P13).

When an IC card 11 for the printer mode is set at step P41, the mode of the system is switched to the printer mode by a subroutine therefor indicated by step P42. In the printer mode, data lines of the image reader 5, the key board 9 and the printer 6 are made active but data lines from the modem 3 to the controller 7 are made inactive, as shown in FIG. 12*d*.

Figure 15:
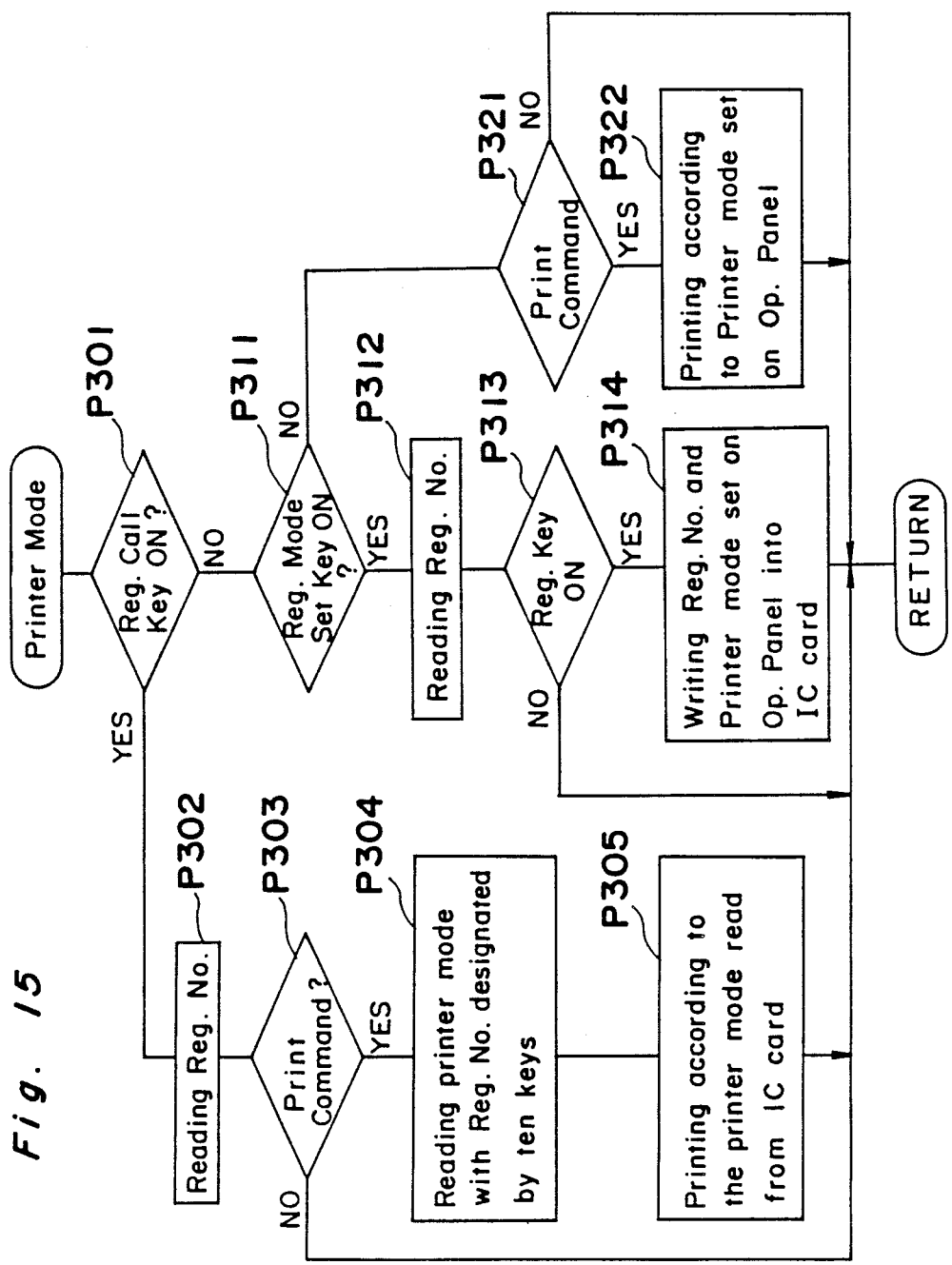
FIG. 15 is a flow chart of a program to be executed in the printer mode.

FIG. 15 shows a flow chart of the printer mode subroutine. If the registration call key 44*i* is pushed down at step P301, and then, one of ten keys 44*a* is operated, a registration number is read into at step P302. If a print command is already sent from the host computer to the controller 7 at step P303, one of sets of use conditions which is identified by the registration number is read into step P304 and a printing operation by the printer 6 is performed according to the use conditions read into at step P305.

If the registration call key 44*i* is not operated but the registration mode set key 44*j* is pushed down at step P311, a registration number is entered with use of ten keys 44*a* at step P312 and, when the registration key 44*g* is operated at step P313, use conditions set with use of the operation board 8 is registered together with the registration number at step P314.

If neither the registration call key 44*i* nor the registration mode set key 44*j* is pushed down at steps P301 and P311, respectively, it is checked at step P321 whether a print command has been sent from the host computer. If it has been sent already, a printing operation is performed according to use conditions set by the operation panel at step P322.

Returning to FIG. 11*b* again, if the IC card 11 is kept inserted for a predetermined time period without any key operation after the completion of the printing operation or the registration of the printer mode, the IC card is ejected automatically at step P46. Then, the system is switched back to the facsimile receiving mode at step P13.

If an IC card for neither of the copy mode, the facsimile mode and the printer mode is inserted into the card read/write device at step P41, the printing function of the system is cancelled to display a warning at step P4.

Even in the case that an IC card 11 for the copy mode or the printer mode has been set, the mode of the system is switched back to the facsimile receiving mode when received data transmitted by the communication line as far as the key 44*e* for giving the priority to the receiving mode has been operated.

If an IC card has a CPU 11*d* therein as shown in FIG. 3(III), it can directly send various control commands to the image reader 5, the printer 6 and/or the modem 2 based on information sent from the controller 7. This simplifies the construction of the controller 7.

It is also possible to form a reader of an IC card and a writer of an IC card separately.

According to the present invention, the mode of the system is never switched to another mode under operation thereof by a mis-operation of the operation panel 8 since individual operational modes are set by IC cards corresponding one to one.

Also, mis-operations are decreased since key operation is simplified. For example, in the copy mode, the user operates only ten keys to set a number of copies before pushing the start button since other copy conditions are already registered in the inserted IC card. Similarly, in the facsimile mode or in the printer mode, the operation of the operation panel is simplified since almost all of necessary conditions are registered in the IC card therefor.

Since individual IC cards store corresponding programs for individual modes, the program to be stored in the system can be minimized in the content and in the volume thereof and, therefore, the controller 7 can be simplified.

The system can be multifunctioned by adding other external devices such as word processor, CRT (Cathode Ray tube) display and so on. In such a case, it is possible to extend the system by preparing respective IC cards in which corresponding programs are registered.

The preferred embodiments described herein are illustrative and not restrictive, the scope of the invention being indicated by the appended claims and all variations which come within the meanings of the claims are intended to be embraced herein.

What is claimed is:

1. A multi-functional imaging apparatus having at least an image reading section, an image forming section and an external image data entering section and being able to function in either one of plural office automation modes which include a copy mode for forming a document image read by the image reading section on a paper in the image forming section and a print mode for forming an image on a paper in the image forming section based on data entered by the external image data entering section which is characterized in comprising:

plural card-like memory means each of which stores a program for controlling respective sections corresponding to one of the office automation modes, means for accommodating either one of plural card-like memory means therein, said means having a reading means for reading a program stored in the card-like memory means when it is accommodated therein, and control means for controlling respective sections so as to perform one of the office automation modes corresponding to the program stored in the card-like memory means when it is accommodated in the accommodating means and, when it is not accommodated therein, to perform a predetermined office automation mode.

2. A multi-functional imaging apparatus according to claim 1 further comprising a modem for transmitting and receiving data which is connected to a communication line wherein the controlling means controls so as to transmit a document image read by the image reading section through the modem and to form an image on a paper in the image forming section based on data received by the modem when a card-like memory means for a facsimile mode is accommodated in the accommodating means.

3. A multi-functional imaging apparatus according to claim 2 wherein the control means makes the modem and the image forming section active to bring the apparatus into a facsimile receiving mode when any one of plural card-like memory means is not accommodated in the accommodating means.

4. A multi-functional imaging apparatus according to claim 2 further comprising a buffer memory means for memorizing transmitted data temporarily, said buffer memory means storing image data received when the apparatus is working in a mode different from the facsimile mode.

5. A multi-functional imaging apparatus having an image reading section, an image forming section and a facsimile transmitting and receiving section and being able to function in either one of plural office automation modes which include a copy mode for forming a document image read by the image reading section on a paper in the image forming section, a facsimile transmitting mode for sending document image data read by the image reading section from the facsimile transmitting and receiving section to a communication line and a facsimile receiving mode for forming an image on a paper in the image forming section based on image data received from the communication line which is characterized in comprising:

plural card-like memory means each of which stores a program for controlling respective sections corresponding to one of the office automation modes, means for accommodating either one of plural card-like memory means therein, said means having a reading means for reading a program stored in the card-like memory means when it is accommodated therein and control means for controlling respective sections so as to perform one of the office automation modes corresponding to the program stored in the card-like memory means when it is accommodated in the accommodating means and, when it is not accommodated therein, to perform the facsimile receiving mode.

6. A multi-functional imaging apparatus according to claim 5 wherein the facsimile transmitting and receiving section has a modem for transmitting and receiving an image data which is connected to a communication line and a buffer memory means for storing a transmitted image data temporarily, said buffer memory means storing an image data receiving by the modem temporarily when the apparatus is actuated in the copy mode according to the program memorized in the card-like memory means being accommodated in the accommodating means.

7. A multi-functional imaging apparatus according to claim 6 further comprising an external image data entering section through which an image data to be formed on a paper by the image forming section is received, wherein the image data received by the modem is stored in the buffer memory temporarily when a card-like memory means corresponding to the printer mode for driving the image forming section based on the image data entered from the external image data entering section is accommodated in the accommodating means and when the apparatus is actuated in the printer mode.

8. A multi-functional imaging apparatus having an image reading section, an image forming section and an external data entering section and being able to function in either one of plural office automation modes which include a copy mode for forming a document image read by the image reading section on a paper in the image forming section and a printer mode for forming an image on a paper in the image forming section based on data entered by the external image data entering section which is characterized in comprising:

plural card-like memory means each of which provides a read only memory for storing a program for controlling respective sections corresponding to either one of plural office automation modes and a non-volatile random access memory capable of writing arbitrary information therein, means for accommodating either one of plural card-like memory means therein, said means having a reading means for reading the program and information stored in the card-like memory means when it is accommodated therein and a writing means for writing information into the random access memory, a control means for controlling respective sections so as to perform one of the office automation modes according to the program read out by the reading means of the accommodating means when a card-like memory means is accommodated therein and, when it is not accommodated therein, to perform a predetermined one of plural office automation modes only and means for entering information to be written into the random access memory of a card-like memory means when it is accommodated in the accommodating means.

9. A multi-functional imaging apparatus according to claim 8 wherein said information entering means includes a key for setting a state in that information is to be written into the random access memory, a group of numerical keys for entering information to be written in said state, a registration key for writing said information entered with use of the group of numerical keys in the random access memory and a call-key for calling the information written in the random access memory.

10. A multi-functional imaging apparatus according to claim 8 in which the information entering means prohibits from writing information of a mode other than the office automation mode designated by the card-like memory means accommodated in the accommodating means.

11. A multi-functional imaging apparatus according to claim 8 in which information to be written into includes control parameters with respect to an office automation mode to be designated by a card-like memory means accommodated in the accommodating means.

12. A multi-functional imaging apparatus according to claim 10 in which the information to be written into for the copy mode includes a size of copy paper to be used and a copy magnification.

13. A multi-functional imaging apparatus according to claim 10 in which the information to be written into for the printer mode includes a print size and a print space to be used upon printing.

14. A multi-functional imaging apparatus having an image reading section, an image forming section and an external data entering section and being able to function in either one of plural office automation modes which include a copy mode for forming a document image read by the image reading section on a paper in the image forming section, a facsimile transmitting mode for sending document image data read by the image reading section from the facsimile transmitting and receiving section to a communication line and a facsimile receiving mode for forming an image on a paper in the image forming section based on image data received from the communication line which is characterized in comprising:

plural card-like memory means each of which provides a read only memory for storing a program for controlling respective sections corresponding to either one of plural office automation modes and a non-volatile random access memory capable of writing arbitrary information therein, means for accommodating either one of plural card-like memory means therein, said means having a reading means for reading the program and information stored in the card-like memory means when it is accommodated therein and a writing means for writing information into the random access memory, a control means for controlling respective sections so as to perform one of the office automation modes according to the program read out by the reading means of the accommodating means when a card-like memory means is accommodated therein and, when it is not accommodated therein, to perform a predetermined one of plural office automation modes only and means for entering information to be written into the random access memory of a card-like memory means when it is accommodated in the accommodating means.

15. A multi-functional imaging apparatus according to claim 14 wherein said information entering means includes a key for setting a state in that information is to be written into the random access memory, a group of numerical keys for entering information to be written in said state, a registration key for writing said information entered with use of the group of numerical keys in the random access memory and a call-key for calling the information written in the random access memory.

16. A multi-functional imaging apparatus according to claim 14 in which the information entering means prohibits from writing information of a mode other than the office automation mode designated by the card-like memory means accommodated in the accommodating means.

17. A multi-functional imaging apparatus according to claim 14 in which information to be written into includes control parameters with respect to an office automation mode to be designated by a card-like memory means accommodated in the accommodating means.

18. A multi-functional imaging apparatus according to claim 16 in which the information to be written into for the facsimile transmitting mode includes telephone number of an address to be transmitted.

* * * * *